Oct. 21, 1952  G. A. GOEPFRICH  2,614,584
SOLENOID ACTUATED VALVE
Filed May 23, 1947

INVENTOR.
GEORGE A. GOEPFRICH
BY
Kenyon & Kenyon
ATTORNEYS

Patented Oct. 21, 1952

2,614,584

UNITED STATES PATENT OFFICE 2,614,584

SOLENOID ACTUATED VALVE

George A. Goepfrich, Stamford, Conn., assignor to The Skinner Chuck Company, Norwalk, Conn., a corporation of Connecticut Application May 23, 1947, Serial No. 749,991

2 Claims. (Cl. 137—729)

This invention relates to solenoid-actuated valves.

An object of this invention is a solenoid-actuated valve of simple construction, low cost, high efficiency, long life and compact structure.

A valve embodying this invention comprises a base having a recess terminating in one surface thereof. Within the recess is arranged an annular valve seat and the base is provided with a pair of ports communicating with opposite sides of the valve seat passageway. A magnetic metal plunger is supported by said base for movement toward and away from said valve seat with means biasing it toward the valve seat. A resilient valve member, such as synthetic rubber, is bonded into the plunger for engagement with the seat and electromagnetic means are provided for effecting movement of the plunger away from the seat.

Other objects, novel features and advantages of this invention will become apparent from the following specification and accompanying drawings, wherein.

Figure 1:
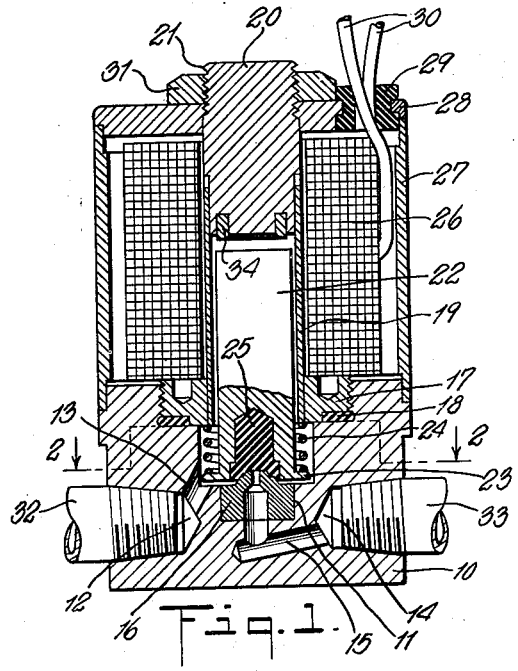
Fig. 1 is a vertical section through a valve embodying the invention.
Figure 2:
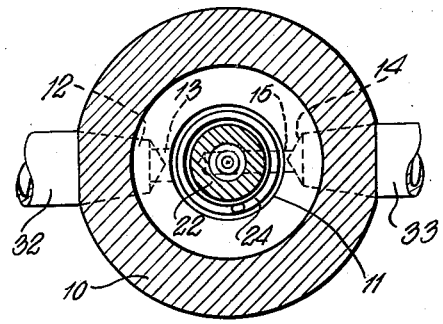
Fig. 2 is a section on the line 2—2 of Fig. 1.

A generally cylindrical metallic base 10 is provided with a recess 11 having three portions of different diameters. A port 12 communicates through a passageway 13 with the recess portion of intermediate size while a port 14 communicates through a passageway 15 with the bottom of the smallest diameter portion of the recess. An annular valve seat 16 is arranged in the smallest diameter recess portion and has its central passageway communicating with the passageway 15.

A bushing 17 is threaded into the largest diameter portion of the recess 11 and bears against a gasket 18. A non-magnetic metal sleeve 19 is fixed to the bushing 17 coaxial therewith and is closed at its upper end by a plug 20 of magnetic metal, the outer end of which is threaded at 21. Within the sleeve 19 is arranged a plunger 22 of magnetic metal for movement toward and away from the valve seat 16.

The plunger has an external collar 23 between which and the sleeve 19 is arranged a spring 24 biasing the plunger toward the valve seat. The end of the plunger 22 is recessed to receive a valve plug 25 of resilient material such as synthetic rubber for engagement with the valve seat 16.

An electromagnetic coil 26 rests on the bushing 17 with the sleeve 19 and plug 20 received in its central passageway. A metal cylinder 27 mounted in the base 10 surrounds the coil 26 and supports a cover 28 in which is arranged an eyelet 29 to receive the lead wires 30 for the coil 26. A nut 31 screwed onto the plug 20 holds the cylinder 27 and cover 28 in assembled relation to the base 10. Cylinder 27 and cover 28 constitute a cup-shaped housing with a hole in the center of its bottom.

A pipe 32 is threaded into the port 12 and a pipe 33 is threaded into the port 14. The valve is designed to control flow of fluid from the pipe 33 to the pipe 32. With the coil 26 de-energized, the spring 24 maintains the valve plug 25 in sealing relation to the valve seat 16 to prevent flow from the pipe 33 to the pipe 32, the intermediate portion of the recess being filled with fluid. Upon energization of the coil 26, the plunger 22 is lifted against the action of the spring 24 to disengage the valve 25 from the seat 16, thereby permitting the flow of fluid from the pipe 33 to the pipe 32. A shading ring 34 is provided in the face of the plug 20 in valves operated by alternating current but is omitted from valves operated by direct current.

Figure 3:
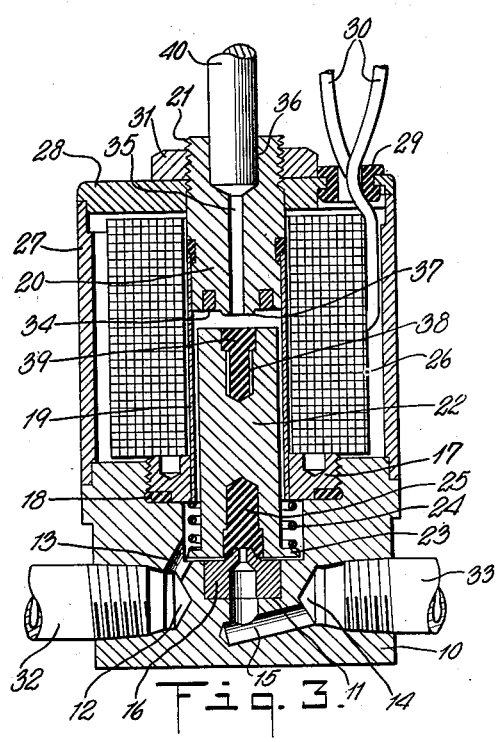
Fig. 3 is a vertical section through a modification.

In the modification of Fig. 3, the plug 20 is provided with a passageway 35 terminating at one end in a port 36 and at its other end in a projecting valve seat 37. In the upper end of the plunger 22 is provided a recess 38 in which is arranged a valve plug 39 of resilient material such, for example, as synthetic rubber. A pipe 40 is fitted into the port 36. The plunger 22 is fluted to allow free flow of liquid past it to the port 36 (Fig. 4.)

The structure disclosed in Fig. 3 constitutes a three-way valve in which the port 14 is the inlet, the port 36 is the outlet and the port 12 is the common port. With the coil 26 de-energized, the spring 24 holds the plunger 22 in such position that the valve plug 25 engages the valve seat 16 thereby preventing flow from the pipe 33 to the pipe 32. However, with the coil 36 de-energized, the valve plug 39 is disengaged from the valve seat 37 so that the pipe 32 is in communication with the pipe 40 through the passageway 13, the annular space around the plunger 22 and the passageway 35. Upon energization of the coil 26, the plunger 22 is lifted to seat the valve plug 39 on the valve seat 37 and disengage the valve plug 25 from the seat 16 so that the pipe 33 is in communication with the pipe 32 through the passageways 15 and 13, but communication between the pipe 32 and the pipe 40 is interrupted.

Figure 4:
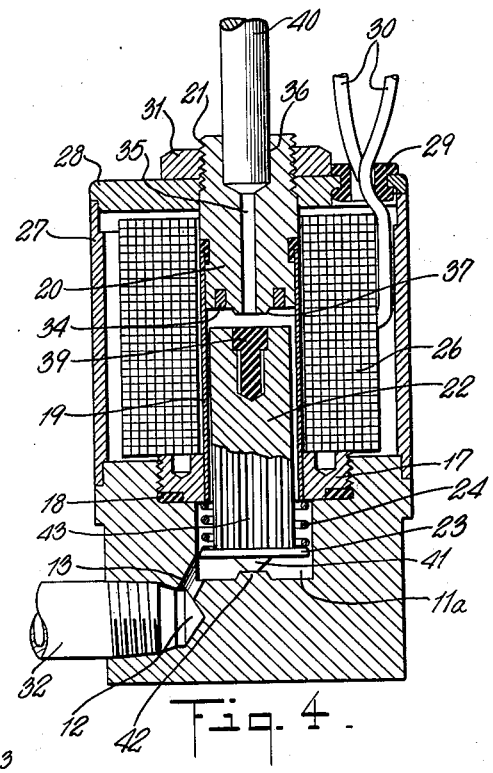
Fig. 4 is a vertical section through a further modification.

In the modification of Fig. 4, the base 10 is provided with a recess 11a having two portions of different diameter and the port 12 communicates through the passageway 13 with the recess portion of smaller diameter. The bushing 17 is threaded into the larger diameter recess portion and bears against the gasket 18. A non-magnetic sleeve 19 is fixed to the bushing 17 and is closed at its upper end by the plug 21 in which is provided the passageway 35 terminating at one end in a port 36 and at its other end in a projecting valve seat 37. In the upper end of the plunger 21 is provided a recess 38 in which is arranged a valve plug 39 of resilient material such, for example, as synthetic rubber. In the lower end of the plunger 22 there is provided a button 41 of non-magnetic metal for engagement with the offset 42 provided in the bottom of the recess 11a. The plunger 22 is formed with longitudinal flutes 43 to form passageways between the plunger and the sleeve 19.

The structure disclosed in Fig. 4 constitutes a normally open valve. With the coil 26 de-energized, the spring 24 holds the plunger 22 with the button 41 engaging the offset 42 in which position the valve plug 39 is disengaged from the valve seat 37 so that the port 12 is in communication with the port 26 by way of the fluted passageways formed in the plunger 22. Upon energization of the coil 26, the plunger 22 is lifted to seat the valve plug 39 on the valve seat 37, thereby interrupting communication between the ports 12 and 36.

This application is a continuation-in-part of Goepfrich, Serial No. 655,686, filed March 20, 1946, now abandoned.

I claim:

1. A valve mechanism comprising a base having a cylindrical recess opening in one surface thereof and having three concentric portions of different diameters comprising an uppermost portion of largest diameter opening in said one surface, an intermediate portion of intermediate diameter extending from the bottom of the uppermost portion, and a lowermost portion of smallest diameter extending from the bottom of the intermediate portion, a first port in said base communicating with the intermediate portion, a valve seat positioned in the lowermost portion to co-operate with the end face of the hereinafter mentioned plunger, a second port communicating with the intermediate portion through said valve seat, a bushing threaded into the uppermost portion, a cylindrical sleeve of non-magnetic material fixed at its lower end into said bushing, a cylindrical plug of magnetic material closing said sleeve at its upper end, the upper end of the plug protruding from the sleeve and being threaded, a cylindrical plunger of magnetic material coaxial with said plug longitudinally movable within said sleeve between said base and plug, a shading ring coaxial with said plug in the end face of said plug facing said plunger, a recess and resilient valve closure member therein in the end face of said plunger facing said valve seat for engaging said valve seat to close said second port when said plunger is at the end of said sleeve adjacent said valve seat, spring means between said bushing and plunger normally biasing said plunger toward the lower end of said sleeve, and an electromagnetic coil surrounding said sleeve which when energized moves said plunger toward the upper end of said sleeve against the biasing force of said spring means, a cup-shaped cylindrical housing with an opening in the center of its bottom inverted over the electro-magnetic coil so that the open end of the cup rests on the base with the threaded upper portion of the plug protruding through the latter opening, and a nut threaded to the upper portion of the plug outside the housing holding the housing against the base.

2. A valve mechanism comprising a base having a cylindrical recess opening in one surface thereof and having three concentric portions of different diameters comprising an uppermost portion of largest diameter opening in said one surface, an intermediate portion of intermediate diameter extending from the bottom of the uppermost portion, and a lowermost portion of smallest diameter extending from the bottom of the intermediate portion, a first port in said base communicating with the intermediate portion, a first valve seat positioned in the lowermost portion to co-operate with the end face of the hereinafter-mentioned plunger, a second port communicating with the intermediate portion through said first valve seat, a bushing threaded into the uppermost portion, a cylindrical sleeve of non-magnetic material fixed at its lower end into said bushing and communicating with said recess, a cylindrical plug of magnetic metal closing said sleeve at its upper end and having a third port communicating with the interior of said sleeve and terminating in a second valve seat, the upper end of the plug protruding from the sleeve and being threaded, a cylindrical plunger of magnetic material coaxial with said plug spaced from and longitudinally movable within said sleeve between said base and plug and having a valve closure member on its upper end face for engaging said second valve seat to close said third port when said plunger is at the upper end of said sleeve, a shading ring coaxial with said plug in the end face of said plug facing said plunger and surrounding said second valve seat, said sleeve constituting a path for the flow of fluid through said valve mechanism between said first and third ports and around said plunger, a valve closure member on the lower end of said plunger for engaging said first valve seat to close said second port when said plunger is at the lower end of said sleeve, spring means between said bushing and plunger normally biasing said plunger toward the lower end of said sleeve whereby said valve mechanism is normally open to the flow of fluid through said path between said first and third ports but closed to the flow of fluid through said recess between said first and second ports, and an electro-magnetic coil surrounding said sleeve for moving said plunger toward the upper end of said sleeve against the biasing force of said spring means to open said valve mechanism to the flow of fluid between said first and second ports and close it to flow between said first and third ports, a cup-shaped cylindrical housing with an opening in the center of its bottom inverted over the electro-magnetic coil so that the open end of the cup rests on the base with the threaded upper portion of the plug protruding through the latter opening, and a nut threaded to the upper portion of the plug outside the housing holding the housing against the base.

GEORGE A. GOEPFRICH.

REFERENCES CITED

The following references are of record in the file of this patent:

UNITED STATES PATENTS

| Number | Name | Date |
|---|---|---|
| 211,044 | Pinisch et al. | Dec. 17, 1878 |
| 959,618 | Schmidt | May 31, 1910 |
| 1,523,112 | Fitz Gerald | Jan. 13, 1925 |
| 1,921,092 | Newton | Aug. 8, 1933 |
| 1,944,113 | Shenton | Jan. 16, 1934 |
| 2,040,964 | Tarleton | May 19, 1936 |
| 2,041,416 | Johnson | May 19, 1936 |
| 2,148,190 | Darling | Feb. 21, 1939 |
| 2,207,082 | Wetzel | July 9, 1940 |
| 2,267,515 | Wilcox et al. | Dec. 23, 1941 |
| 2,289,310 | Steel | July 7, 1942 |
| 2,353,835 | Lane | July 18, 1944 |
| 2,379,536 | Mackenzie | July 3, 1945 |
| 2,405,127 | Beach | Aug. 6, 1946 |
| 2,458,123 | Wasserlein | Jan. 4, 1949 |

FOREIGN PATENTS

| Number | Country | Date |
|---|---|---|
| 512,449 | Germany | Nov. 12, 1930 |